(12) United States Patent
Wuertz

(10) Patent No.: US 7,314,012 B2
(45) Date of Patent: Jan. 1, 2008

(54) METHOD AND APPARATUS FOR SPLITTING, MULCHING, AND LEVELING SOIL BEDS FOR PLANTING

(76) Inventor: Howard A. Wuertz, 3227 W. Bechtel Rd., Coolidge, AZ (US) 85228

( * ) Notice: Subject to any disclaimer, the term of this patent is extended or adjusted under 35 U.S.C. 154(b) by 159 days.

(21) Appl. No.: 11/032,763

(22) Filed: Jan. 10, 2005

(65) Prior Publication Data

US 2006/0150875 A1 Jul. 13, 2006

(51) Int. Cl.
  *A01C 5/00* (2006.01)
  *A01C 7/18* (2006.01)
(52) U.S. Cl. ............ 111/22; 111/62; 111/165; 111/168
(58) Field of Classification Search ......... 111/52–62, 111/134–137, 66–71, 79, 81, 139, 140, 149, 111/157, 163–169, 190–196, 15, 18, 20–22
See application file for complete search history.

(56) References Cited

U.S. PATENT DOCUMENTS

| | | | | |
|---|---|---|---|---|
| 4,054,007 A | * | 10/1977 | Moore | 47/1.7 |
| 4,461,355 A | * | 7/1984 | Peterson et al. | 172/156 |
| 6,454,019 B1 | * | 9/2002 | Prairie et al. | 172/677 |

* cited by examiner

*Primary Examiner*—Christopher J. Novosad
(74) *Attorney, Agent, or Firm*—Tod R. Nissle, P.C.

(57) ABSTRACT

Apparatus is provided for splitting, mulching, and leveling soil beds for planting. The apparatus adapts to changes in contour and elevation of a soil bed to insure that seeds are planted at equivalent depths along the length of the bed. The apparatus includes a tracking wheel that rises and falls with concomitant changes in the elevation of the top of the soil bed and that causes associated bed preparation apparatus to rise and fall simultaneously with the tracking wheel.

1 Claim, 8 Drawing Sheets

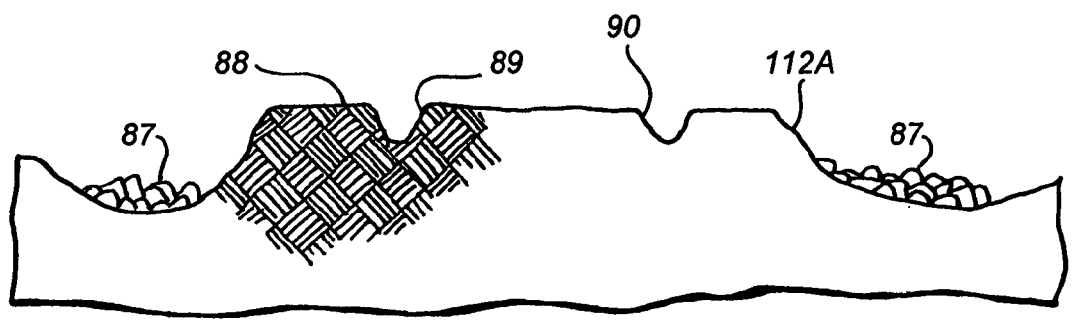
*FIG. 10*
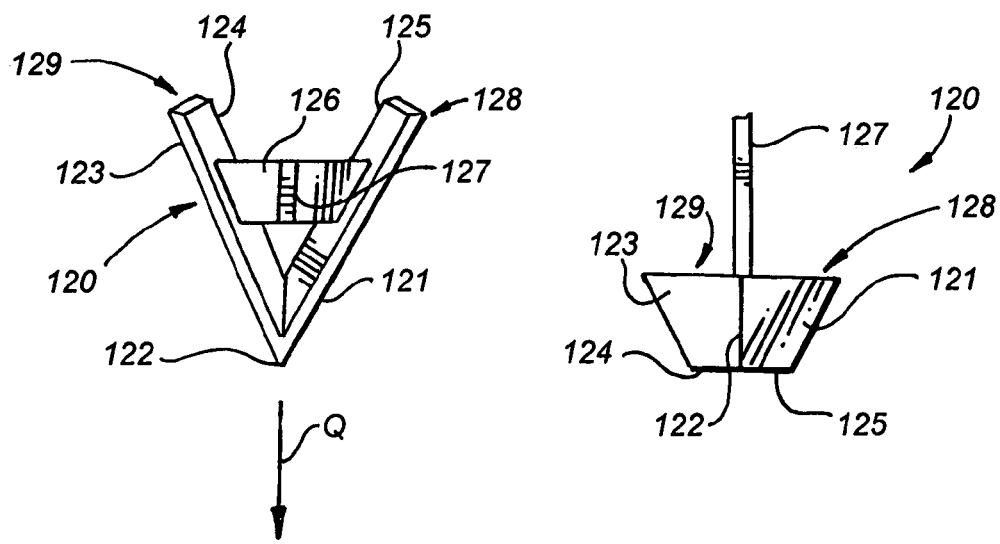
*FIG. 11*      *FIG. 12*

METHOD AND APPARATUS FOR SPLITTING, MULCHING, AND LEVELING SOIL BEDS FOR PLANTING

This invention pertains to agricultural equipment.

More particularly, the invention relates to apparatus for preparing to receive seed the soil beds in a field.

In another respect, the invention relates to apparatus that insures that seed is planted at a uniform depth along the length of a bed regardless of variations in the shape and dimension of the bed.

Apparatus for working and shaping the soil beds in a field is well known as is demonstrated by U.S. Pat. No. 4,779,684 to Schultz. One problem, however, the appears to have persisted is insuring that seed is planted at a uniform depth in a bed regardless of variations in the shape and height of the bed.

Accordingly, it would be highly desirable to provide improved soil bed preparation apparatus that insures that seed is planted at a relatively uniform depth at desired points along the length of the bed.

Therefore, it is a principal object of the invention to provide improved apparatus for preparing a soil bed to receive seed.

Another object of the invention is to provide improved apparatus that tracks and adjusts to variations in the configuration of a soil bed to insure that seed is planted in the bed at a uniform depth along the length of the bed.

These and other, further and more specific objects and advantages of the invention will be apparent from the following detailed description of the invention, taken in conjunction with the drawings, in which:

FIG. 10 is a front elevation view illustrating soil beds in a field subsequent to preparation with the apparatus of FIG. 5;

FIG. 11 is a top view illustrating an alternate furrow guide used in the apparatus of the invention; and, FIG. 12 is a front view illustrating the furrow guide of FIG. 11.

Briefly, in accordance with my invention, I provide an improved apparatus for preparing an elongate soil bed for planting. The soil bed includes a top having a first lower elevation and a second higher elevation. The apparatus comprises a primary frame adapted to be moved along the ground in a selected direction of travel; an auxiliary frame mounted on the primary frame for movement between at least two operative positions, a first lower operative position, and a second upper operative position; at least one ground engaging disk mounted on the auxiliary frame to move soil off the top of the soil bed; and, at least one ground engaging tracking wheel rotatably mounted on the auxiliary frame to move along the top of the soil bed when the primary frame moves along the ground in the selected direction of travel. The tracking wheel and disk move simultaneously with the auxiliary frame when the frame moves from the first to the second operative position. The tracking wheel upwardly displaces the auxiliary frame from the first to the second operative position when the tracking wheel moves from the first lower elevation to the second higher elevation on the bed.

Figure 1:
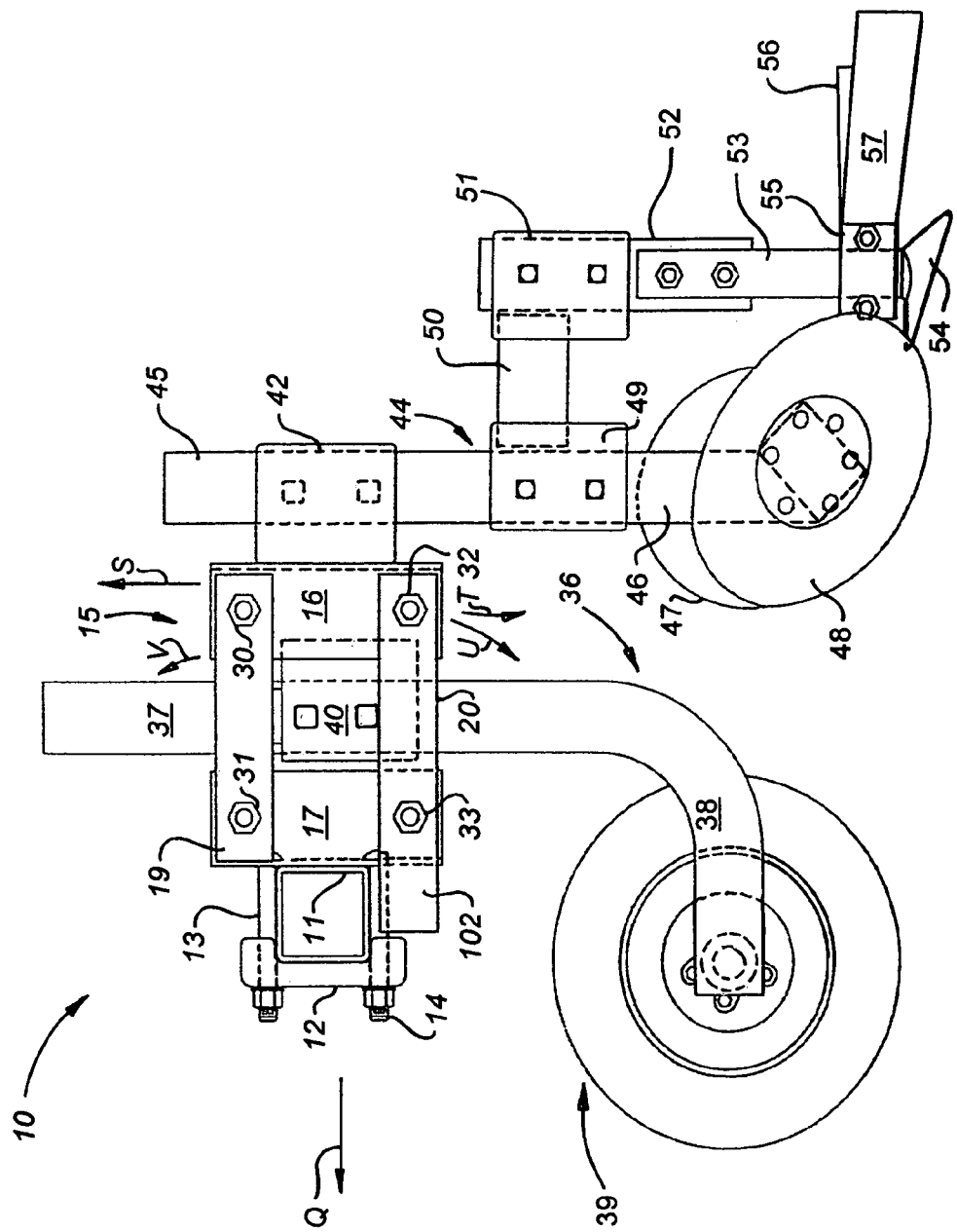
FIG. 1 is a side elevation view illustrating bed preparation apparatus constructed in accordance with the principles of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates soil preparation apparatus 10 constructed in accordance with the invention and including a primary frame including horizontally oriented bar 11, an auxiliary frame 15 pivotally mounted on bar 11, a ground engaging tracking wheel 39 rotatably mounted on frame 15, a pair of disks 47 and 48 rotatably mounted on frame 15, a triangular sweep or mulcher 54 mounted on frame 15, and a pair of spreader bars or wings 56 and 57 mounted on frame 15.

In addition to bar 11, the primary frame includes member 17 fixedly secured to bar 11, and other components (not shown) to secure the primary frame to a tractor or other motive power means to push or pull the primary frame along a field in a desired direction Q of travel, which direction of travel ordinarily is parallel to the parallel equally-spaced horizontally oriented longitudinal soil beds 110, 111 (FIG. 8), 112 (FIG. 7) that comprise a field being prepared with the apparatus of the invention.

Orthogonal auxiliary frame 15 includes U-shaped member 16. Members 16 and 17 are interconnected on one side by a first pair of spaced apart upper 19 and lower 20 rectangular members and on the other side by a second identical spaced apart pair of upper 18 and lower 18A (FIG. 6) members. Bolts 30 and 31 pivotally connect the ends of member 19 to members 16 and 17, respectively. Bolts 32 and 33 pivotally connect the ends of member 20 to members 16 and 17, respectively. Bolts 35 and 34 pivotally connect the ends member 18 to members 16 and 17, respectively. Bolts also pivotally connect to members 16 and 17 the ends of the afore-mentioned lower member 18A. As a result, although member 17 remains in fixed position on frame 11, member 16 can move up and down in the directions generally indicated by arrow S and T because each end of each member 18, 18A, 19, 20 pivots about the bolt connecting the end to member 16 or 17, as the case may be.

When member 16 moves downwardly in the direction generally indicated by arrow T, the end of member 20 attached to member 16 moves, along with bolt 32 and member 16, downwardly along an arc in the direction indicated by arrow U. Similarly, the end of member 19 attached to member 16 moves, along with bolt 30 and member 16, downwardly in the direction indicated by arrow U; the end of member 18 attached to member 16 moves, along with bolt 35 and member 16, downwardly in the direction indicated by arrow U; and, the end of member 18A attached to member 16 moves, along with member 16, downwardly in the direction indicated by arrow U. The end of member 19 secured to member 17 pivots about bolt 31, and bolt 31 remains fixed and does not move. The end of member 20 secured to member 17 pivots about bolt 33, and bolt 33 remains fixed and does not move. The end of member 18 secured to member 17 pivots about bolt 34, and bolt 34 remains fixed and does not move. The end of member 18A secured to member 17 pivots on member 17. The bolt connecting member 18A to member 17 does not move.

When member 16 moves upwardly in the direction generally indicated by arrow S, the end of member 20 attached to member 16 moves, along with bolt 32 and member 16, upwardly along an arc in the direction indicated by arrow V. Similarly, the end of member 19 attached to member 16 moves, along with bolt 30 and member 16, upwardly in the direction indicated by arrow V; the end of member 18 attached to member 16 moves, along with bolt 35 and member 16, upwardly in the direction indicated by arrow V; and, the end of member 18A attached to member 16 moves, along with member 16, upwardly in the direction indicated by arrow V. The end of member 19 secured to member 17 pivots about bolt 31, and bolt 31 remains fixed and does not move. The end of member 20 secured to member 17 pivots about bolt 33, and bolt 33 remains fixed and does not move. The end of member 18 secured to member 17 pivots about bolt 34, and bolt 34 remains fixed and does not move. The end of member 18A secured to member 17 pivots on member 17. The bolt connecting said end of member 18A to member 17 remains fixed and does not move.

Figure 6:
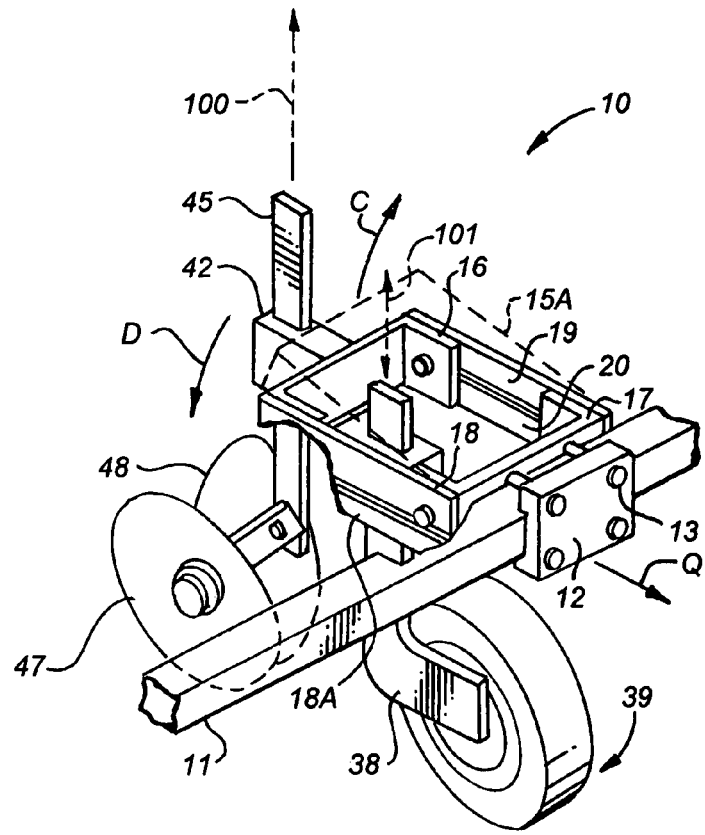
FIG. 6 is a perspective view of a portion of the apparatus of FIG. 1 illustrating the mode of operation thereof.

The upward pivoting of members 16, 18, 19 from the position shown in FIG. 1 is indicated in FIG. 6 by arrow C and by dashed lines 15A. When members 16 to 19 pivot upwardly, disks 47 and 48 and wheel 39 simultaneously move upwardly with members 16 and 19, respectively. Similarly, when members 16, 18, 19 pivot downwardly from the position shown in FIG. 1 in the direction of arrow D, disks 47 and 48 and wheel 39 simultaneously move downwardly with members 17 and 19. When apparatus 10 (or 70) is being moved along a soil bed 110 or 111 (FIG. 8) in the direction of arrow Q, the position of the primary frame 11, 17 is generally fixed. As, however, wheel 39 moves over the top of the bed 110 or 111, the wheel 39 follows the contour of the top of the bed 110 or 111 and rises or falls (i.e., "floats") simultaneously with a corresponding rise or fall in the elevation of the top of the bed 110 or 111. When the elevation of the top of the bed 110 or 111 increases, wheel 39 moves upwardly. When wheel 39 moves upwardly, wheel 39 upwardly displaces member 19 and causes member 19 (and consequently members 20 and 18 and 18A) to move upwardly about an arc in the direction of arrow C. When members 18 to 20 move upwardly, disks 47 and 48 are simultaneously upwardly displaced. When the elevation of the top of the soil bed 110 or 11 decreases, wheel 39 moves downwardly. When wheel 39 moves downwardly, wheel 39 downwardly displaces member 19 and causes member 19 (and consequently members 20 and 18 and 18A) to move downwardly along an arc in the direction of arrow D. When members 18 to 20 move downwardly, disks 47 and 48 are simultaneously downwardly displaced. As a result, the elevation of wheel 39 changes when the elevation of the top of a bed 110, 111 changes (1) so that the amount of soil removed from the top of the bed 110, 111 tends to remain the same even though the elevation of the bed changes, and (2) so that the depth of a seed furrow 83, 85, 89, 90 formed by sweep 54 tends to remain constant even though the elevation of the bed varies.

The embodiment of the invention illustrated in the drawings permits wheel 39 to rise and fall with corresponding changes in the elevation of the top of a soil bed 110 to 112. The concomitant rise and fall and "floating" 101 of wheel 39 with corresponding increases and decreases in the elevation of the top of a soil bed is enabled because auxiliary frame 15 pivots about bolts that secure pivotally frame 15 to member 17. Permitting wheel 39 to float also enables disks 47 and 48 to float 100 simultaneously with wheel 39. Any desired mechanism or construction can be utilized that enables the same function and result.

Wheel 39 is rotatably mounted on the lower end 38 of L-shaped member 36. The upper end 37 of member 36 is slidably inserted in sleeve 40 and is fixedly secured by bolt 41 (FIG. 2) in sleeve 40 that is fixedly mounted on member 19 of auxiliary frame 15. End 37 is preferably, although not necessarily, adjustably fixedly secured in sleeve 40 with a set screw, a bolt, quick release pin, or any other desired fastening system that permits the position of end 37 in sleeve 40 to be adjusted.

Disks 47 and 48 are rotatably mounted in V-shaped relationship on the lower end 46 of orthogonal member 44. The upper end 45 of member 44 is slidably inserted in sleeve 42 and is fixedly secured in sleeve 42 that is fixedly mounted on member 16 of frame 15. End 45 is preferably, although not necessarily, adjustably fixedly secured in sleeve 42 with a set screw, a bolt, quick release pin, or any other desired fastening system that permits the position of end 45 in sleeve 42 to be adjusted.

Sleeve 49 is slidably fixedly mounted on the intermediate portion of member 44. Sleeve 49 is preferably, although not necessarily, adjustably fixedly secured to member 44 with a set screw, a bolt, quick release pin, or any other desired fastening system that permits the position of sleeve 49 on member 44 to be adjusted.

Arm 50 fixedly secures sleeve 51 to sleeve 49. The upper end of member 52 is slidably inserted in sleeve 51 and is fixedly secured in sleeve 51. The upper end of member 52 is preferably, although not necessarily, adjustably fixedly secured in sleeve 51 with a set screw, a bolt, quick release pin, or any other desired fastening system that permits the position of the upper end of member 52 in sleeve 51 to be adjusted.

Sweep or mulcher 54 is fixedly connected to the lower end of arm 53. The upper end of arm 53 is fixedly secured to the lower end of member 52. Sleeve 55 is connected to arm 53. Spreader bars 56, 57 are connected to sleeve 55.

U-shaped member 17 is removably secured in fixed position on member 11 by bolts 13, 14 and clamp 12. Member 11, clamp 12, and bolts 13 and 14 are omitted from FIGS. 2 and 4 for sake of clarity.

Figure 2:
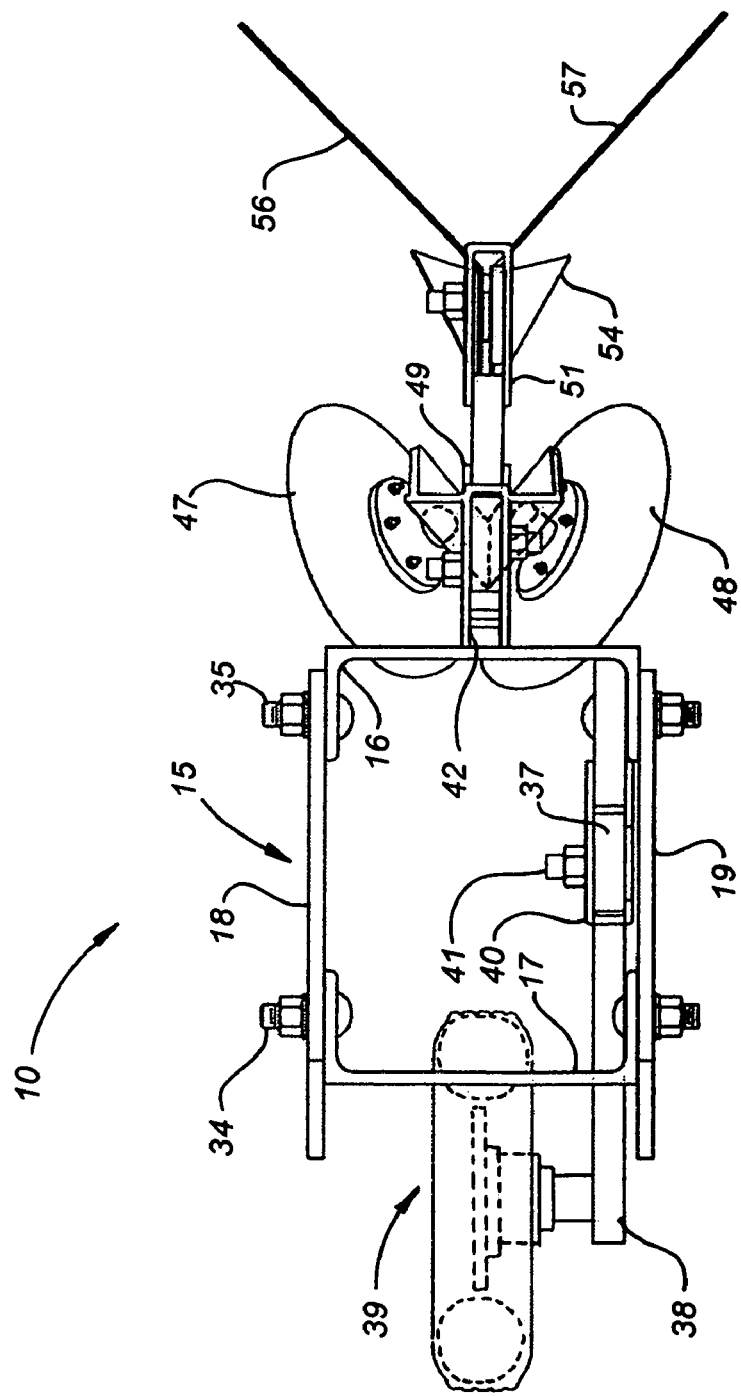
FIG. 2 is a top view of the apparatus of FIG. 1 further illustrating further construction details thereof.
Figure 3:
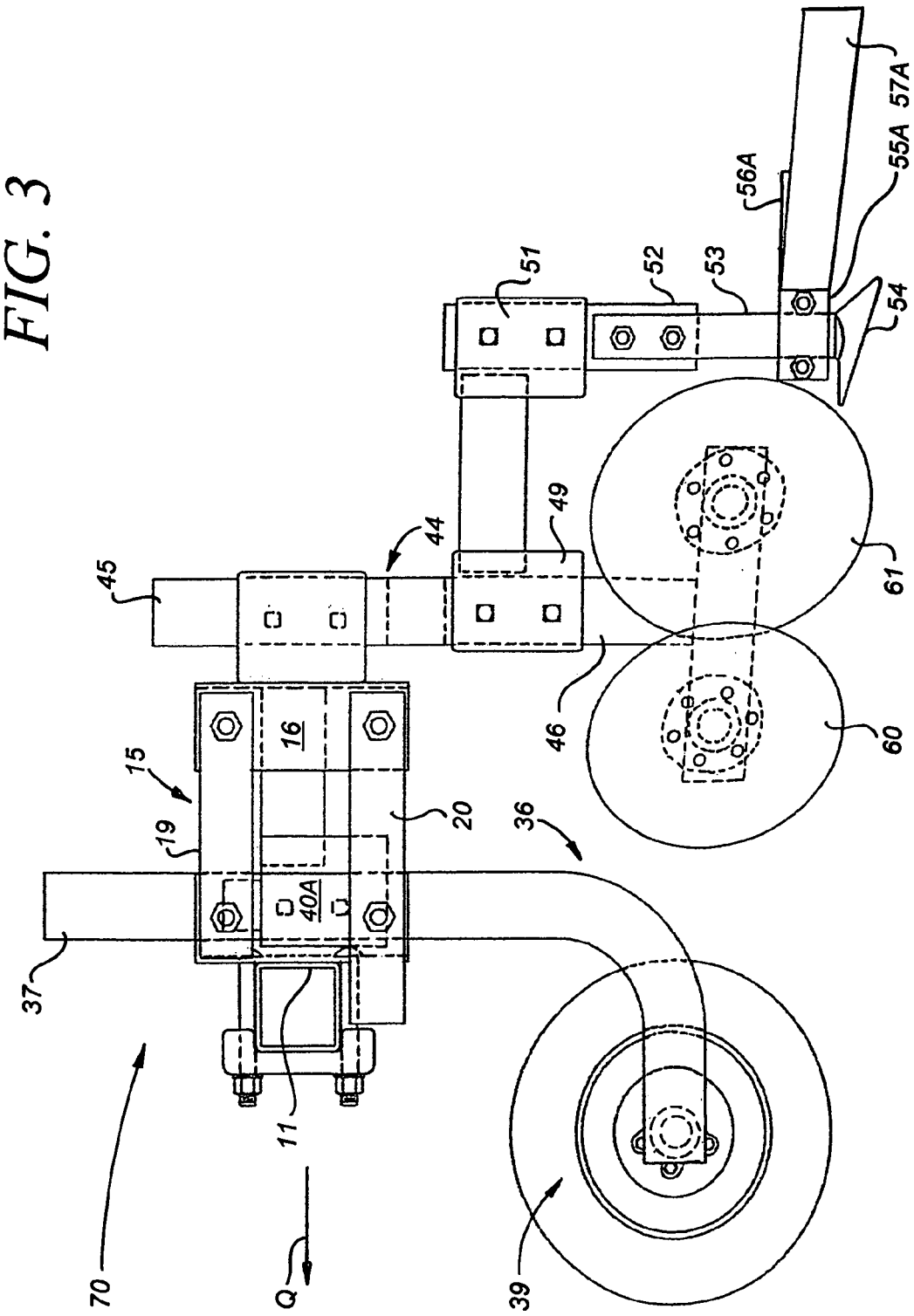
FIG. 3 is a side elevation view illustrating an alternate embodiment of the bed preparation apparatus of the invention.
Figure 4:
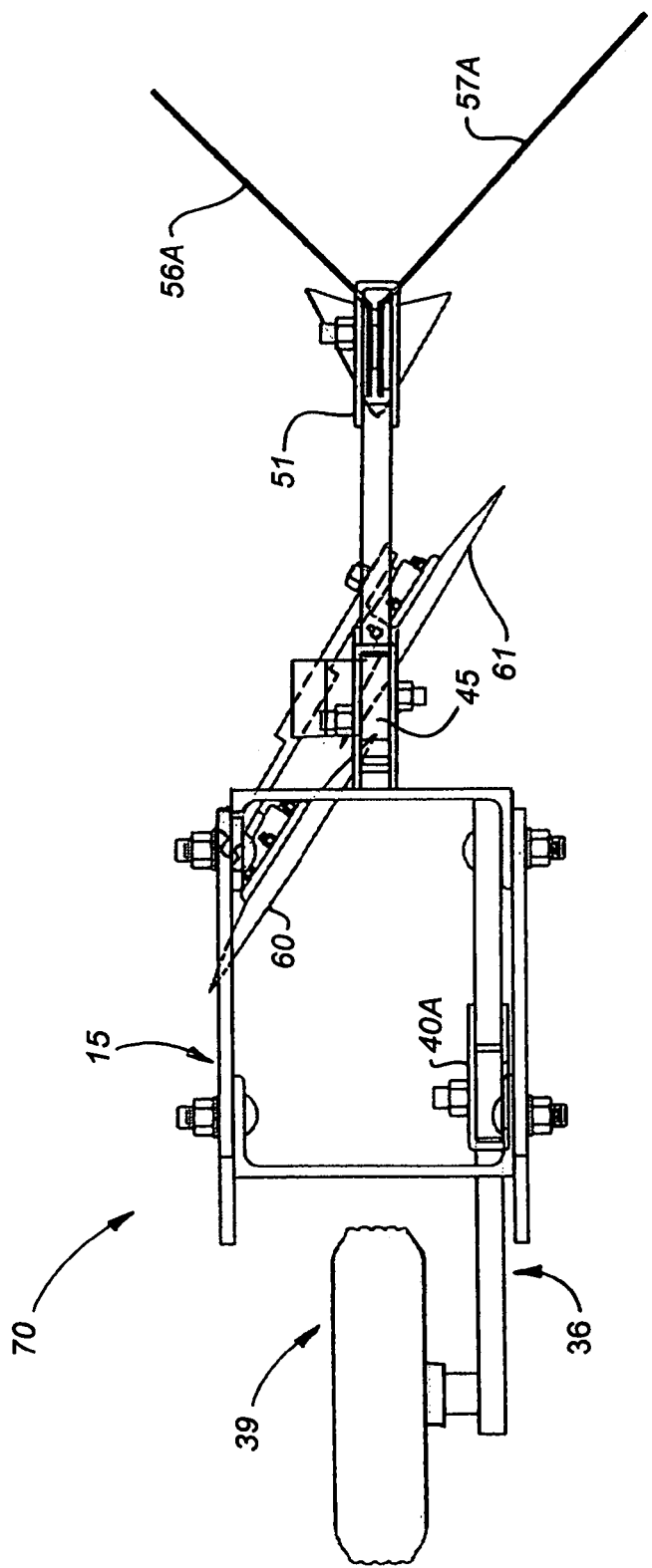
FIG. 4 is a top view of the apparatus of FIG. 3 illustrating additional construction details thereof.

FIGS. 3 and 4 illustrate an alternate embodiment 70 of the invention. The soil bed preparation apparatus 70 of FIGS. 3 and 4 is identical to that of FIGS. 1 and 2 except that the position in auxiliary frame 15 of sleeve 40A for upper end 37 is, in comparison to sleeve 40 in FIGS. 1 and 2, moved forward toward member 11; and, except that disks 47 and 48 are replaced by a pair of disks 60 and 61 that are not in V-shaped relationship but that are instead in a relationship in which disks 60 and 61 are each parallel to a plane that is canted with respect to the direction of travel Q of apparatus 70. As will be described, the apparatus of FIGS. 3 and 4 is used to prepare soil beds that are about thirty inches wide and that will include a pair of seed furrows that are spaced apart about fifteen inches and that are each about seven inches from a side of the soil bed.

Figure 5:
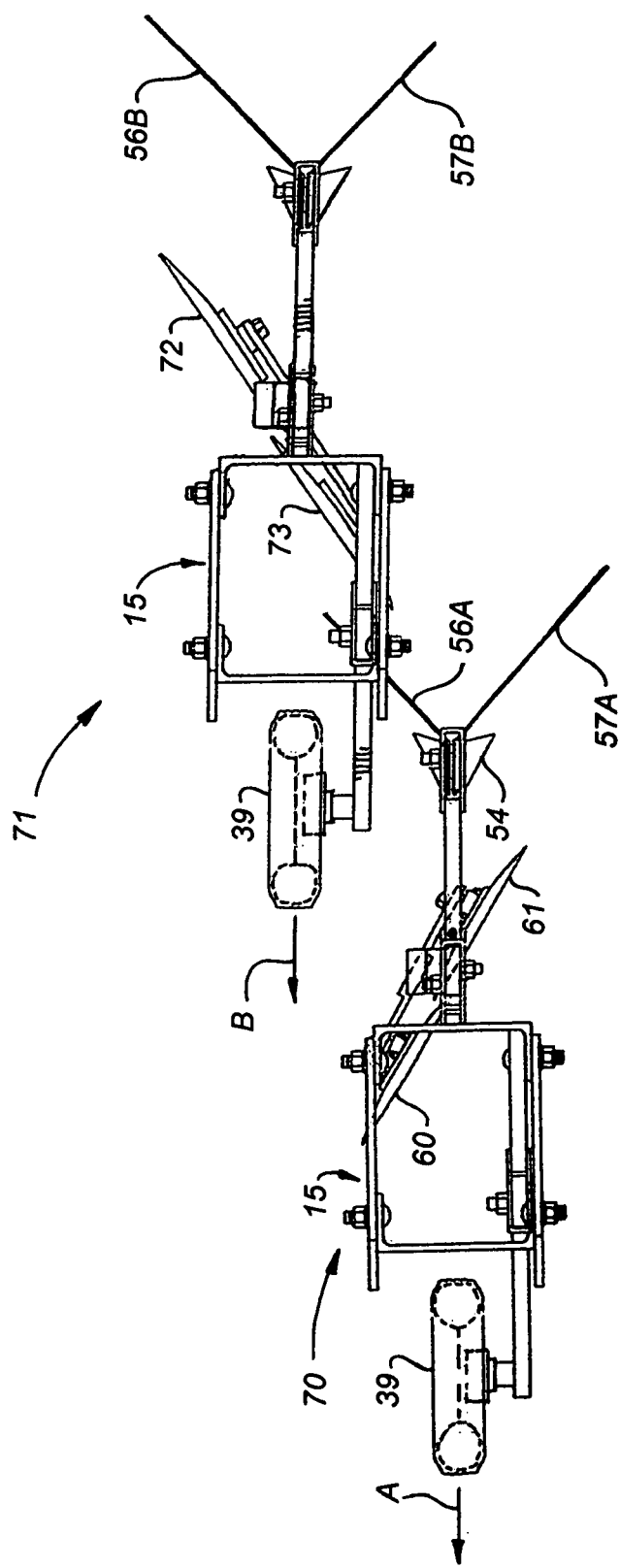
FIG. 5 is a top view illustrating a pair of apparatus of the type depicted in FIG. 3, which apparatus is used in tandem to prepare a wide bed to receive seed.

FIG. 5 illustrates apparatus 70 utilized in tandem with apparatus 71 and being moved across field in directions of travel A and B, respectively. Direction of travel A is equivalent to direction of travel B. Apparatus 71 is identical to apparatus 70 except that in apparatus 71 (1) disks 72 and 73 replace disks 60 and 61; (2) disks 72 and 73 are each parallel to a plane that is canted in a different direction than is the plane that is parallel to disks 60 and 61; and, (3) spreader bar 56B is longer than spreader bar 56A and spreader bar 57B is shorter than spreader bar 57A. Spreader bar 57B is equivalent to bar 56A in shape and dimension. Bar 57A is equivalent to bar 56B in shape and dimension to bar 56B.

Figure 7:
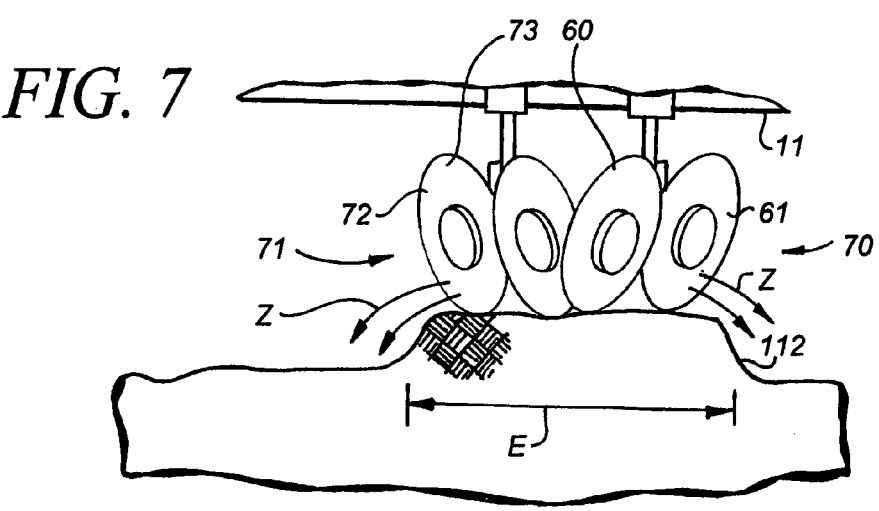
FIG. 7 is a front elevation view illustrating the mode of operation of the apparatus of FIG. 5.

The apparatus of FIG. 5 is, as depicted in FIG. 7, utilized to prepare a wider bed 112 by moving dirt off to either side of the bed in the manner indicated by arrows Z. The width E of bed 112 can vary but is typically about thirty inches.

Figures 8, 9:
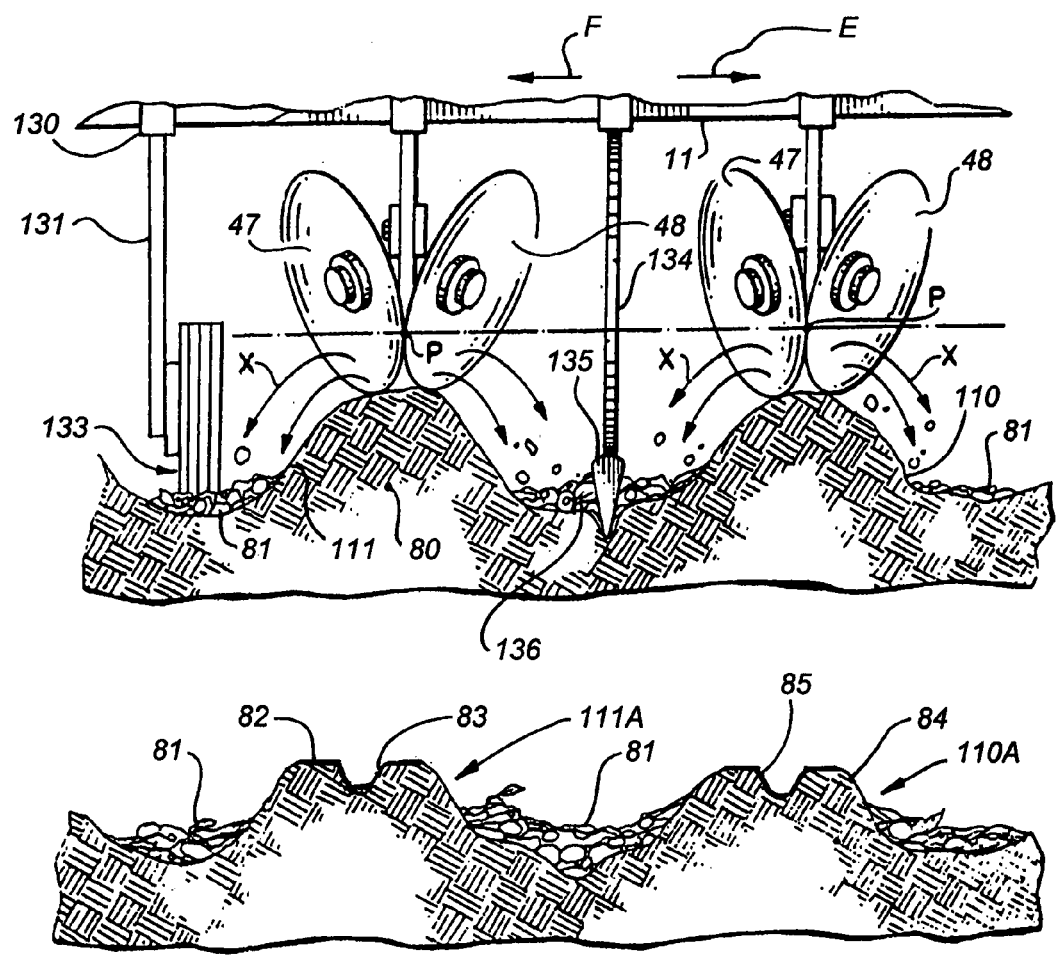
FIG. 8 is a front elevation view further illustrating the mode of operation of the apparatus of FIG. 1.
FIG. 9 is a front elevation view illustrating soil beds in a field after preparation with the apparatus of FIG. 1.

The use of the apparatus of FIGS. 1, 2, 6 is further illustrated in FIG. 8. Each disk pair 47 and 48 functions to dispense soil 81 from the top of a bed 110, 111 in the directions indicated by arrow X into furrows on either side of the bed. The outer circumferential edge of one disk 47, 48 meets and rotates over the other disk 47, 48 at point P. Wheel 39 and other portions of apparatus 10 are omitted in FIG. 8 for sake of clarity.

FIG. 9 illustrates beds 111A and 110A. Bed 11A is produced from bed 111 when apparatus 10 passes along the top of bed 111 in the manner suggest in FIG. 8 in a direction of travel that is normal to the plane of the paper of the FIG. 9 drawing and that is above and parallel to the center 80 of the bed. Bed 110A is produced from bed 110 when apparatus 10 passes along the top of bed 110 in a direction of travel that is normal to the plane of the paper of the FIG. 9 drawing and that is above and parallel to the center of the bed 110. A furrow 83 is formed by sweeper 54 in the upper generally flat surface 82 of bed 111A. A furrow 85 is formed by sweeper 54 in the upper generally flat surface 84 of be 110A. Surfaces 82 and 84 are formed by spreader bars 56, 57 in each apparatus 10.

FIG. 10 illustrates bed 112A. Bed 112A is produced from bed 112 when the apparatus 70, 71 of FIG. 5 passes along the top of bed 112 in the manner suggested in FIG. 7 in a direction of travel that is normal to the plane of the paper of the FIG. 10 drawing and that is above and parallel to the center of the bed. Furrows 89, 90 are formed in the upper generally flat surface 88 of bed 112A. Each furrow 89, 90 is formed by a different one of the sweepers 54 in apparatus 70, 71. Surface 88 is formed by spreader bars 56A, 57A, 56B, 57B in apparatus 70, 71.

In use, apparatus 10 (or 70, 71) is provided. The position of upper end 37 in sleeve 40 is slidably adjusted so that wheel 39 is a desired distance beneath member 20. End 37 is fixed in sleeve 40. The position of upper end 45 in sleeve 42 is slidably adjusted so that disks 47, 48 are a desired distance beneath member 20. End 45 is fixed in sleeve 42. The position of the upper end of member 72 in sleeve 51 (and of sleeve 49 on member 44) is slidably adjusted such that sweep 54 is a desired distance beneath member 20. The upper end of member 52 is fixed in sleeve 51. The position of sleeve 55 on member 53 is slidably adjusted such that the spreader bars 56, 57 are a desired distance beneath member 20. Sleeve 55 is fixed on member 53.

Frame 11 of apparatus 10 is secured to a tractor or other motive power apparatus to pull or push frame 11 over a field in the direction of arrow Q such that wheel 39, each pair of disks 47 and 48, sweeper 54, and spreader bars 56 and 57 move along the top of a soil bed 110, 111 and remove soil from the top of the bed 110, 111 in the direction of arrow X into furrows adjacent bed 110, 111. Wheel 39 moves over the top of the bed 110, 111. Sweeper 54 forms a furrow 83, 85 in the bed. Spreader bars 56, 57 level the top of the bed to form upper generally level bed surface 82, 84.

When the height of bed 110, 111 increases, wheel 39 is upwardly displaced. This causes members 17 to 19 to pivot and be upwardly displaced, which causes an accompanying upward displacement of disks 47 and 48, sweeper 54, and spreader bars 56 and 57.

When the height of bed 100, 111 decreases, wheel 39 moves downwardly. This causes members 17 to 19 to pivot and be downwardly displaced, which causes an accompanying downward displacement of disks 47 and 48, sweeper 54, and spreader bars 56 and 57.

In FIG. 8, furrow guide 135 functions to help maintain the apparatus on track such that bar 11 and the remainder of the apparatus do not move laterally in the direction of arrows E and F and such that disk pairs 47, 48 track along the top of beds 110 and 111 and do not veer off the top and to the sides of beds 110 and 111. Guide 135 is mounted on the lower end of rigid elongate arm 134. The upper end of arm 134 is adjustably connected to bar 11 such that the distance of guide 135 below arm 11 can be adjusted. The shape and dimension of furrow guide 135 can be varied as desired. A furrow guide 120 which can, for example, be mounted on the lower end of arm 134 in place of guide 135 is illustrated in FIGS. 11 and 12.

Furrow guide 120 includes canted upright side plates 128, 129 that co-terminate along the leading edge 122 of guide 120. Guide 120 moves along a furrow 136 in the same direction of travel Q as bar 11 and as the remaining bed shaping apparatus that is mounted on bar 11. Plate 129 includes outer side face 123 and includes lower edge 124. Edge 124 contacts soil in a furrow 136. Plate 128 includes outer side face 121 and lower edge 125. Edge 125 contacts soil in a furrow 136. Horizontally oriented support plate 126 is fixedly welded or otherwise connected to the inner face of plate 129 and to the inner face of plate 128. The lower end of arm 127 is fixedly secured to plate 126. The upper end of arm 127 is adjustably mounted on bar 11 in the same manner as the upper end of arm 134.

One or more gauge wheels 133 (FIG. 8) are preferably, but not necessarily, mounted on bar 11. Each wheel 133 is pivotally mounted on the lower end of an arm 131. The upper end of the arm 131 is adjustably connected 130 to bar 11 such that the distance of wheel 133 beneath bar 11 can be adjusted. Wheels 133 perform an important function because they tend to fix or maintain the proper distance of bar 11 above the beds in a field. When gauge wheels 133 are not utilized, furrow guides 120, 135 are sometimes forced into the ground to a greater than desired depth by the weight of bar 11 and the other components mounted on bar 11.

End 102 can pivot or move upwardly a selected distance but eventually contacts bar 11. This permits end 102 to function as a stop when the apparatus of FIG. 1 is lifted off the ground.

Having described my invention in such terms as to enable those of skill in the art to make and practice it, and having described the presently preferred embodiments thereof, I claim:

1. Apparatus for preparing an elongate soil bed for planting, the bed including a top having a first lower elevation and a second higher elevation, the apparatus comprising
   (a) a primary frame (11) adapted to be moved along the ground in a selected direction of travel;
   (b) an auxiliary frame (15) mounted on said primary frame for movement between at least two operative positions, (i) a first lower operative position, and
(ii) a second upper operative position;
(c) at least one ground engaging disk (48) mounted on said auxiliary frame and placed beneath said auxiliary frame to engage the top of the soil bed and to move soil off the top of the soil bed;
(d) at least one ground engaging tracking wheel (39) rotatably mounted on said auxiliary frame forwardly of said disk and spaced beneath said auxiliary frame to contact the top of the soil bed and to move along the top of the soil bed ahead of said disk when said primary frame moves along the ground in said selected direction of travel;
(e) spreader bars (56, 57) mounted on said auxiliary frame rearwardly of said disk and spaced beneath said auxiliary frame to contact the top of the soil bed and to level the top of the bed;

said tracking wheel and disk moving simultaneously with said auxiliary frame when said auxiliary frame moves from said first to said second operative position; and, said tracking wheel upwardly displacing said auxiliary frame from said first to said second operative position when said tracking wheel moves from said first lower elevation to said second higher elevation on said bed.

* * * * *